United States Patent [19]
Hillier, Jr.

[11] 3,877,764
[45] Apr. 15, 1975

[54] FURNITURE MODULE LOCKING DEVICE
[76] Inventor: John A. Hillier, Jr., Mechanic St., North Bennington, Vt. 05257
[22] Filed: Oct. 25, 1973
[21] Appl. No.: 409,676

[52] U.S. Cl. ............... 312/107; 52/753 C; 312/111; 312/198; 312/263
[51] Int. Cl. .......................................... A47b 87/00
[58] Field of Search ........... 312/107, 111, 198, 263, 312/257 R; 85/5 B, 5 BC; 182/130, 181, 178; 403/217, 219, 388; 52/754, 760, 753 C, 582, 584; 248/200, 205

[56] References Cited
UNITED STATES PATENTS

| | | | |
|---|---|---|---|
| 682,621 | 9/1901 | Humphrey | 312/263 |
| 1,599,252 | 9/1926 | Simpson | 52/754 X |
| 2,688,525 | 9/1954 | Lindstron | 52/760 X |
| 2,858,725 | 11/1958 | Thompson | 85/5 CP |
| 3,188,696 | 6/1965 | Earhart | 52/753 C |
| 3,604,774 | 9/1971 | Furman | 312/263 |
| 3,650,586 | 3/1972 | Nitingale et al. | 312/111 X |
| 3,746,417 | 7/1973 | Sasnett | 312/263 |

FOREIGN PATENTS OR APPLICATIONS

| | | | |
|---|---|---|---|
| 362,166 | 12/1931 | United Kingdom | 85/5 B |

*Primary Examiner*—James T. McCall
*Attorney, Agent, or Firm*—Clarence A. O'Brien; Harvey B. Jacobson

[57] ABSTRACT

A furniture module securing, locking device in the form of a bracket having a longitudinal plate provided with spaced, parallel edges, a back plate connected to the longitudinal plate at a one end thereof and arranged extending perpendicularly therefrom, and a flange connected to and arranged extending parallel to and perpendicularly from a one of the edges of the longitudinal plate codirectionally with the back plate. The latter is spaced from an adjacent end of the flange to form a slot arranged for receiving a back panel of an associated furniture module or unit. A further flange may be connected to the other of the edges of the longitudinal plate and arranged parallel to and extending codirectionally with the first flange for forming a channel disposed for receiving a pair of parallel panels of adjacent furniture units. A locking pin having a spring-biased retaining ball is arrangeable through openings in both flanges for retaining the panels in the channel. The locking device is mounted on a top or base of a furniture assembly by direct attachment of the back plate for selectively attaching to it side and back panels in order to secure a furniture unit together and to another unit.

2 Claims, 8 Drawing Figures

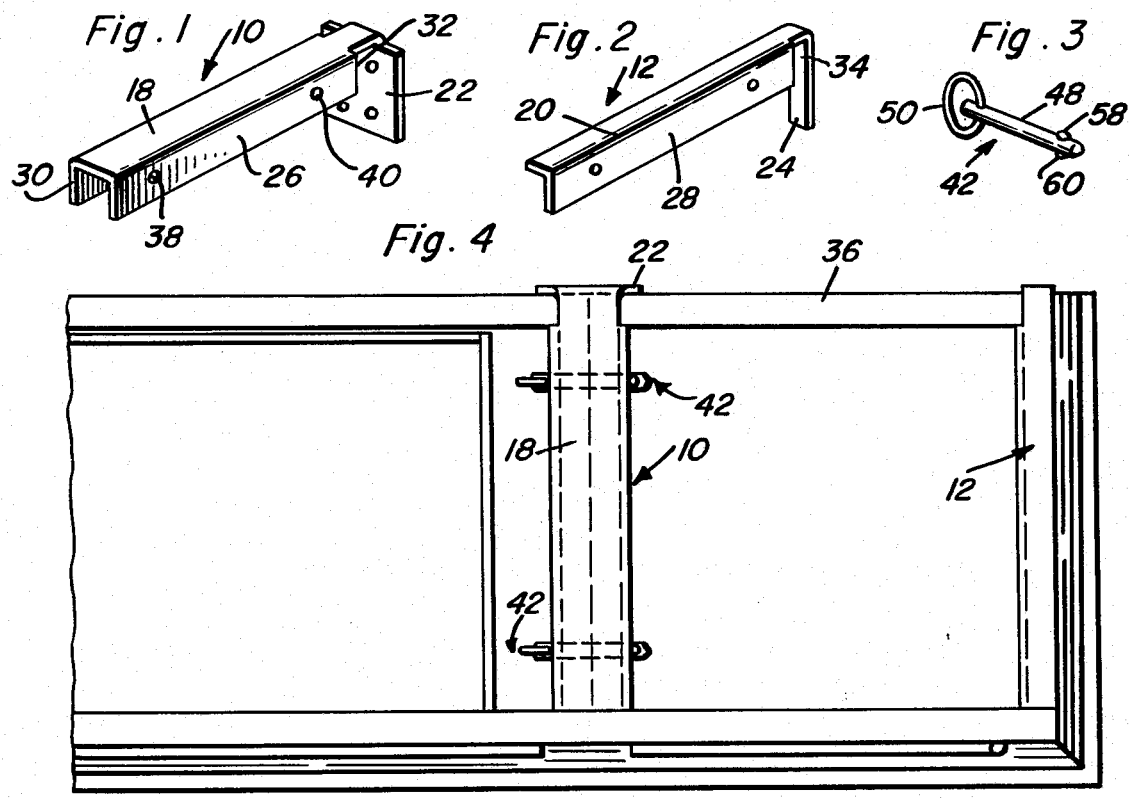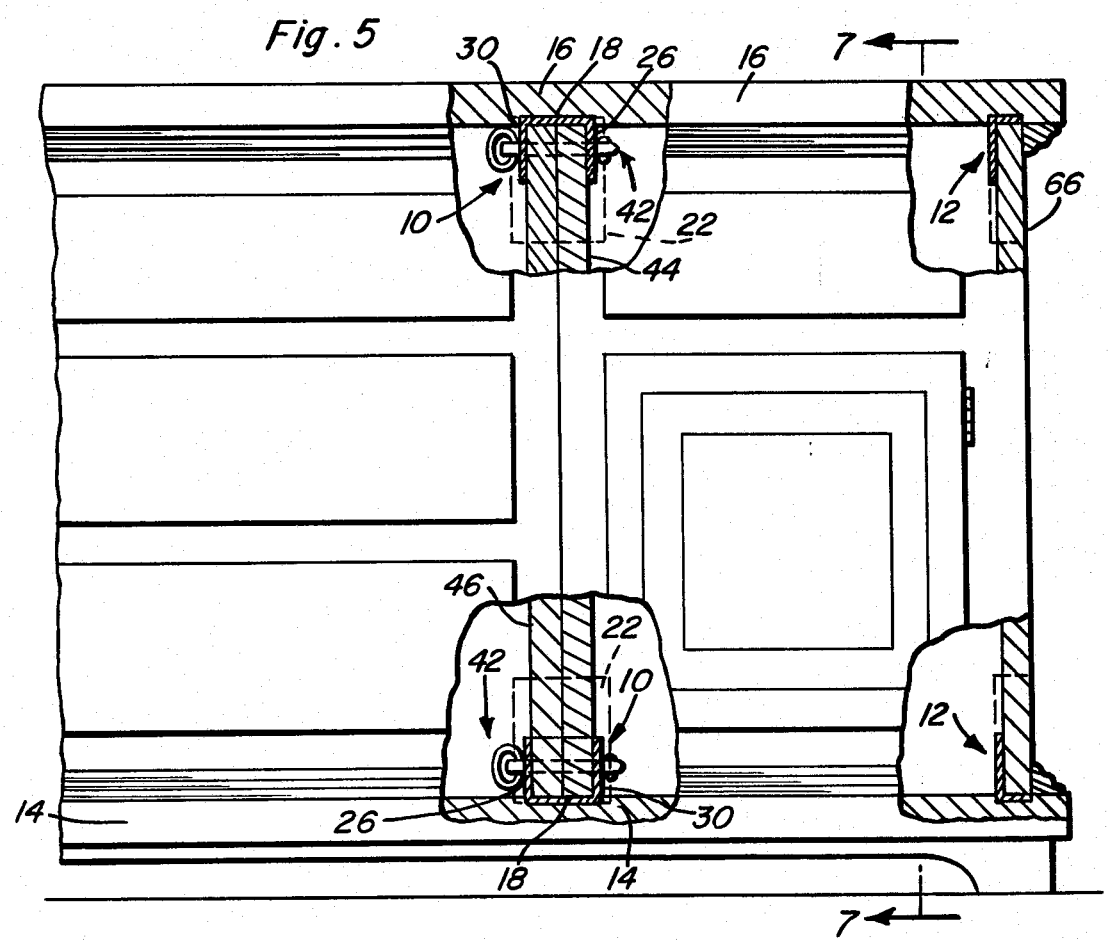

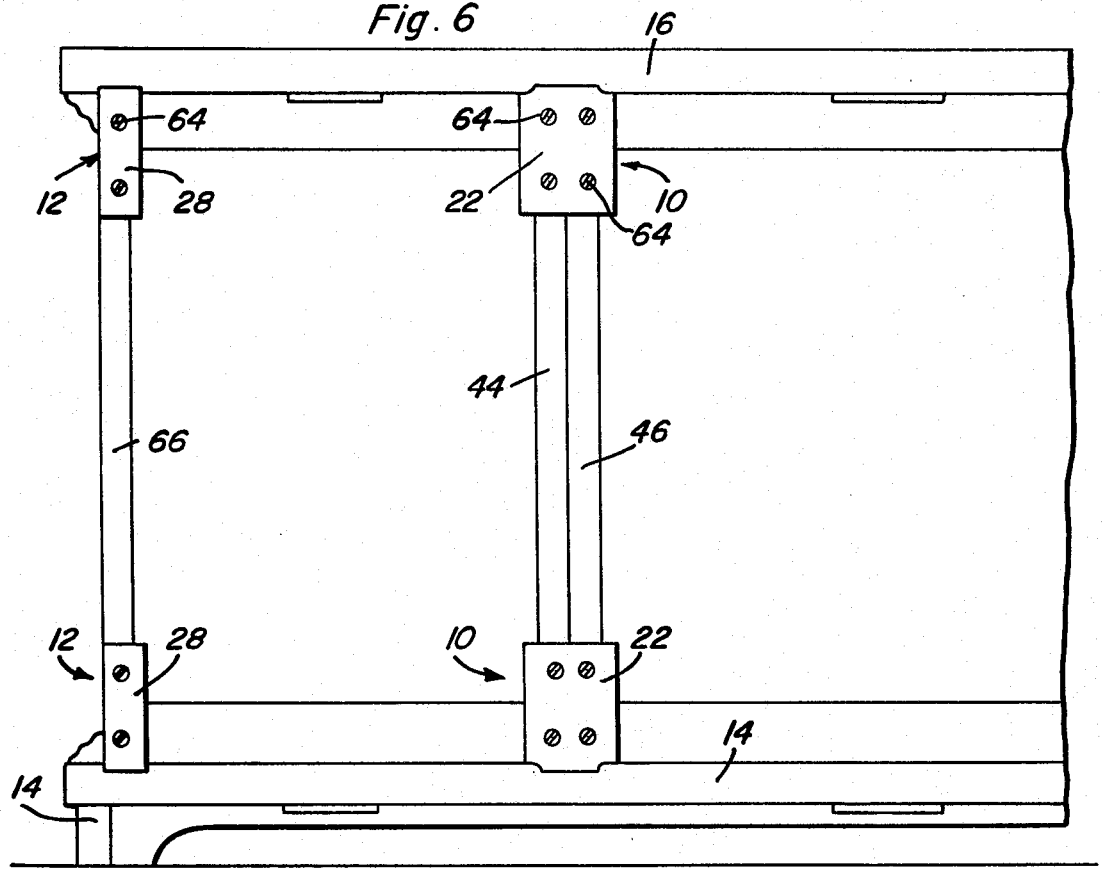
Fig. 6
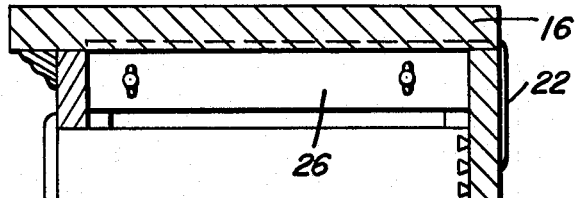
Fig. 7
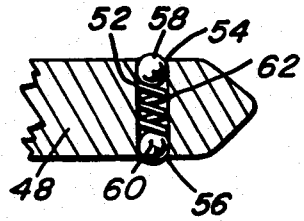
Fig. 8
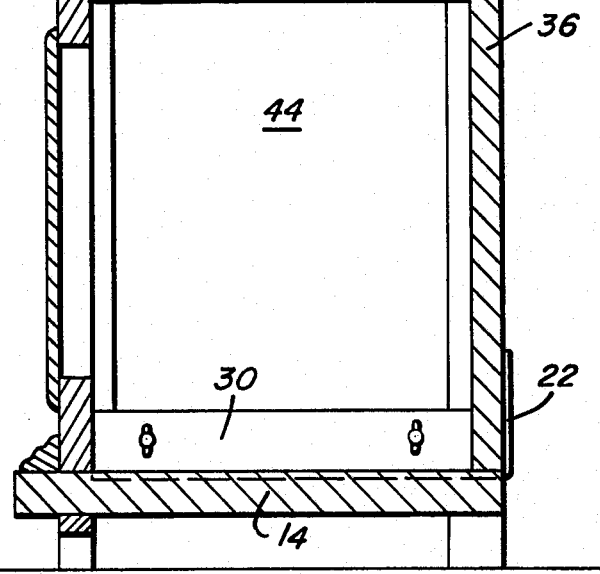

FURNITURE MODULE LOCKING DEVICE

BACKGROUND OF THE INVENTION

1. Field of the Invention

This invention relates generally to a bracket for attachment to a plurality of associated members, and particularly to a locking device for securing a furniture unit, or module, together and to other units.

2. Description of the Prior Art

It is generally known, as shown in, for example, U.S. Pat. No. 2,790,691, issued Apr. 30, 1957 to W. E. Goebel, and 2,906,574, issued Sept. 29, 1959 to E. C. Bullock, to use brackets to join together adjacent members, such as cabinet modules and tabletops, to form an assembly. These brackets, however, only connect together assembled modules, which frequently must be preassembled at a factory and subsequently shipped in assembled form.

It is also generally known to use a locking pin to join modules to one another. See, for example, U.S. Pat. No. 3,650,586, issued Mar. 21, 1972 to P. L. Nightingale et al.

SUMMARY OF THE INVENTION

It is an object of the present invention to provide a locking device for joining two cabinets, chests, and the like, together.

It is a further object of the present invention to provide a locking device for securing side and back panels of a cabinet unit to their associated top and base members.

It is yet another object of the present invention to provide a furniture module locking device which permits the modules to be constructed in a generally conventional manner.

It is still another object of the present invention to provide a furniture unit locking device which permits the unit to be shipped in a knockdown mode for assembly by the final consumer.

Yet another object of the present invention is to provide modular furniture units which can be combined and assembled at their point of sale to give the purchaser a multiple choice of cabinet and/or chest units to satisfy the individual desires or needs of the purchaser.

Still another object of the present invention is to provide modular furniture units which permit the purchaser to change, or add to, the original piece at a later date as desired or as needs may change.

Another object of the present invention is to provide modular furniture units which will reduce the damage factor usual in the shipment of case goods by providing knock-down construction heretofore unavailable to the general class of furniture involved.

In addition to the above, it is also an object of the present invention to provide furniture construction permitting replacement of damaged sections only rather than requiring replacement of an entire piece.

These and other objects are achieved according to the present invention by providing a locking device in the form of a bracket mountable on one of a base and a top of a furniture assembly, and arrangeable for receiving a panel of the furniture unit.

One preferred embodiment of a bracket according to the present invention has a longitudinal plate provided with spaced, parallel edges and spaced ends, a back plate connected to the longitudinal plate at a one of the ends of the latter and arranged extending perpendicularly therefrom, and a flange connected to and arranged extending parallel to and perpendicularly from a one of the edges of the longitudinal plate codirectionally with the back plate, the back plate being spaced from an adjacent end of the flange to provide a slot arranged for receiving a back panel of an associated furniture unit.

Another preferred embodiment of a bracket according to the present invention has a further flange connected to the other of the edges of the longitudinal plate and arranged parallel to and extending codirectionally with the one flange for forming a channel disposed for receiving a pair of parallel panels of adjacent furniture units.

When two flanges extend from the longitudinal plate, these flanges may be provided with at least one pair of opposed openings arranged for receiving a locking pin.

A preferred locking pin for use with brackets according to the present invention has a longitudinal shaft selectively arrangeable in opposed openings provided in the flanges and provided with a pull ring mounted at a one end and a hole arranged passing through the shaft transversely to the longitudinal extent thereof disposed adjacent the other longitudinal end. This hole terminates in apertures formed in a surface of the shaft, the apertures being of a cross-sectional size less than that of the hole, and a ball is arranged in the hole for free movement with respect thereto, but being of a diameter greater than the size of the apertures. A spring arranged in the hole biases the ball toward an associated one of the apertures. Alternatively, a pair of balls may be arranged in the hole, one ball being associated with one aperture.

The two preferred brackets discussed above may be used to connect top and base members of a furniture assembly to side and back panels of furniture units forming cabinets, chests, and the like, in any desired combination and arrangement of these units.

These together with other objects and advantages which will become subsequently apparent reside in the details of construction and operation as more fully hereinafter described and claimed, reference being had to the accompanying drawings, forming a part hereof, wherein like numerals refer to like parts throughout.

BRIEF DESCRIPTION OF THE DRAWINGS

FIGS. 1 and 2 are right front perspective views respectively showing two preferred embodiments of locking devices according to the present invention.

FIG. 3 is a left front perspective view showing a locking pin for use with the locking device of FIG. 1.

FIG. 4 is a fragmentary, top plan view, with a top member removed, showing a furniture assembly in which the units are joined by brackets according to the present invention.

FIG. 5 is a fragmentary, front elevational view, partly cut away and in section, showing the assembly of FIG. 4.

FIG. 6 is a fragmentary, rear elevational view showing the assembly of FIGS. 4 and 5.

FIG. 7 is a sectional view taken generally along the line 7—7 of FIG. 5.

FIG. 8 is a fragmentary, longitudinal sectional view showing a detail of the locking pin of FIG. 3.

DESCRIPTION OF THE PREFERRED EMBODIMENTS

Locking devices 10 (FIG. 1) and 12 (FIG. 2) are intended to be mounted on one of a base member 14 and a top member 16 (FIGS. 5–7) and arranged for receiving a panel, either side or back, of a furniture unit used in making up a furniture assembly.

Both brackets 10 and 12 have a longitudinal plate 18 and 20 provided with spaced, parallel longitudinal edges and spaced longitudinal ends, a back plate 22 and 24 connected to the plate 18, 20 at a one of the spaced ends of the plate and arranged extending perpendicularly therefrom, and a flange 26 and 28 connected to and arranged extending parallel to and perpendicularly from a one of the edges of the associated plate 18, 20 codirectionally with the back plate 22, 24. Locking device 10 is additionally provided with a further flange 30 connected to the other of the edges of the longitudinal plate and arranged parallel to and extending codirectionally with its associated flange 26 for forming a channel disposed for receiving a pair of parallel panels of adjacent furniture units forming at least part of a furniture assembly. Back plates 22 and 24 are spaced from an adjacent end 32 and 34 of the common flange 26, 28 to provide a slot arranged for receiving a back panel 36 (FIGS. 4 and 7) of a furniture unit.

In the back plate 22 of locking device 10, flanges 26 and 30 are provided with at least one pair of opposed openings, two pairs 38 and 40 being shown, arranged for receiving a locking pin 42 (FIGS. 3 and 5). A pair of abutting side panels 44 and 46 adjacent furniture units are arranged in the channel, and locking pins 42 cooperate with openings 38, 40 to retain panels 44, 46 in the channel of locking device 10.

Referring now to FIGS. 3 and 8 of the drawings, each locking pin 42, which is selectively arrangeable in the opposed openings 38, 40 provided in flanges 26, 30, has a longitudinal shaft 48 provided with a pull ring 50 mounted at a one end and a hole 52 arranged passing through the shaft transversely to the longitudinal extent thereof and terminating in apertures 54 and 56 formed in a surface of shaft 48. Apertures 54, 56 are of a cross-sectional size, or preferably a diameter, less than that corresponding size of hole 52. A pair of balls 58 and 60 are arranged in hole 52 for free movement with respect thereto, and are of a diameter greater than the size of apertures 54 and 56 so that they will not pass therethrough. A spring 62, which may be of any suitable, known construction, is arranged in hole 52 between balls 58 and 60 for biasing same toward their respective apertures 54 and 56.

Screws 64, and the like, may be passed through the holes provided in back plates 22 and 24 and in flange 28 of device 12 for securing same to a side panel 66 and other associated components of a furniture unit, or module, used in varying combinations to form a furniture assembly by arranging a selected assortment of furniture units between base member 14 and top member 16 and attaching the units to the members 14 and 16 by locking devices 10 and 12. The latter may be conventionally affixed to members 14 and 16 as desired by a, for example, suitable adhesive, such as an epoxy resin.

Members 14 and 16 could be sized to accommodate, for example, one, two, and three cabinet and chest units. Additional sizes could be made available as desirable. A furniture system construction using locking devices according to the present invention thus permits a dealer to offer his customers a personal choice of arrangements of drawers, storage cabinets, shelves, and the like, in multiples of two or more which will form their personal double, triple, and the like, dresser, cupboard, or chest. This can be done with a minimum of inventory by the dealer. For example, in order for a dealer to offer his customer the same wide choice of arrangements in standard dressers and chests as is possible with an inventory of three each of three cabinet and chest units assembled according to the present invention it would be necessary for the dealer to carry an inventory of three single cabinet units, at least six double dressers, at least ten triple dressers, and a minimum of six chests, considering only double unit chests. This does not take into consideration the additional variety of personal choice possible by varying the location of the units in relation to each other.

In addition to the multiple choice feature of furniture construction using locking devices according to the present invention, a dealer can realize savings in inventory, warehouse storage, and transportation costs as the furniture could be shipped from the factory under the knock-down classification. There also would be a definite reduction in damage to the goods.

The only work required at dealers' warehouses or at the point of sale would be to assemble the base and top with the desired furniture units, put the necessary screws in the locking device back plate 22, 24, and insert locking pins 42 into the locking devices 10.

At the manufacturing level, the furniture system construction using locking devices according to the present invention permits the use of shorter lengths of lumber, standardization in cuttings, handling, and storage savings in both in-process and finished goods. Units which have factory defects can be repaired or rejected with a minimum of loss as compared with standard dressers and chests. Likewise, models that do not sell well can be discontinued and new styles introduced with a minimum of manufacturing change and sales procedure alteration.

As can be appreciated from the above description and from the drawings, furniture systems constructed using locking devices according to the present invention will give the consumer an unequal selection of quality cases at reduced cost.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A furniture system including a plurality of modular units, each unit comprising, in combination:
   a. separate, vertically spaced base and top members;
   b. a plurality of panels, including a back panel and a pair of spaced, parallel side panels, the back panel being arranged in perpendicular relationship with respect to the side panels, with each of the panels extending between the base and top members;
   c. a plurality of brackets, each bracket mounted on one of the base and top members and arranged for receiving the back panel and one of the side panels, the brackets being substantially coextensive with the side panels, the brackets each including a longitudinal plate affixed to a face of one of the top member and bottom member that opposes the other member, the longitudinal plate having spaced, parallel, longitudinal edges and spaced longitudinal ends, a back plate connected to the longitudinal plate at a one of the ends of the latter and arranged extending perpendicularly from the longitudinal plate and associated member, and a flange connected to and arranged extending parallel to and perpendicularly from a one of the edges of the longitudinal plate codirectionally with the back plate for abutting one of the panels, the back plate spaced from an adjacent end of the flange a distance providing a slot arranged for receiving the back panel and one of the side panels, the back plate being connected to the back surface of the back panel, a portion of the brackets further including a further flange connected to the other of the edges of the longitudinal plate and arranged parallel to and extending codirectionally with the flange for forming a channel disposed for receiving adjacent side panels and a side panel of adjacent modular units; and d. means including locking pins and openings provided in each of the flanges and further flanges of each of the portions of the brackets and in the side panels for receiving the pins and selectively attaching the portions of the brackets to adjacent side panels of adjacent units.

2. A structure as defined in claim 1, further including a locking pin selectively arrangeable in the opposed openings provided in the flange and further flange of the portion of the brackets, the pin including a longitudinal shaft provided with a pull ring mounted at a one end and a hole arranged passing through the shaft transversely to the longitudinal extent thereof and terminating in apertures formed in a surface of the shaft, the apertures being of a cross-sectional size less than the corresponding size of the hole, a ball arranged in the hole for free movement with respect thereto, the ball being of a diameter greater than the size of the apertures, and spring means arranged in the holes for biasing the ball toward one of the apertures.

* * * * *